March 21, 1967 P. J. WEAVER 3,309,964
MACHINE TOOL
Original Filed June 1, 1961 3 Sheets-Sheet 1
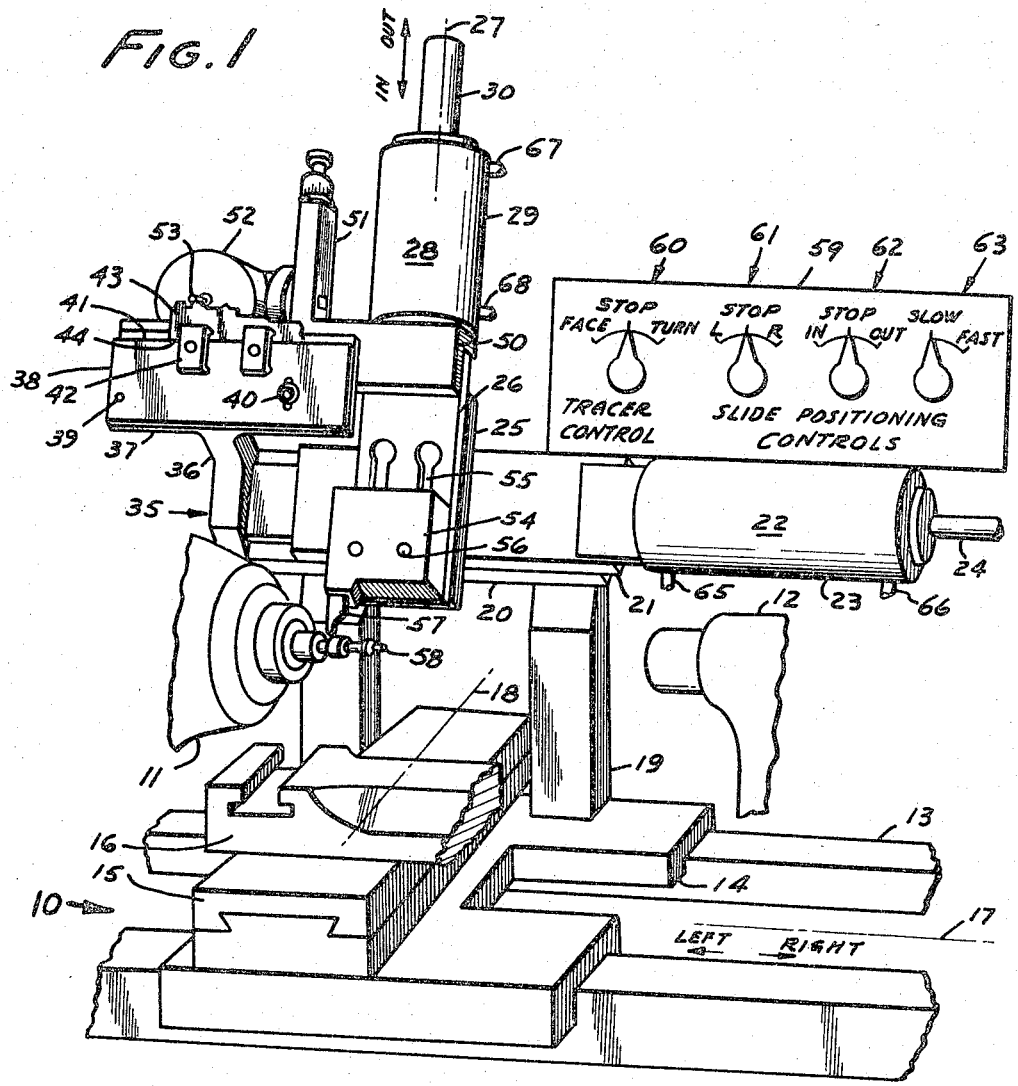
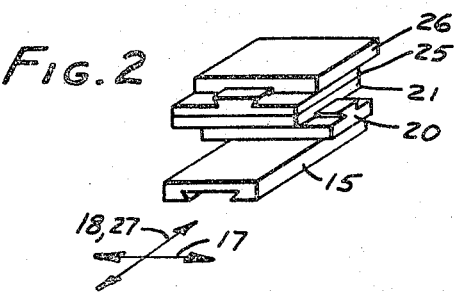
INVENTOR.
PAUL J. WEAVER
BY
ATTORNEYS.

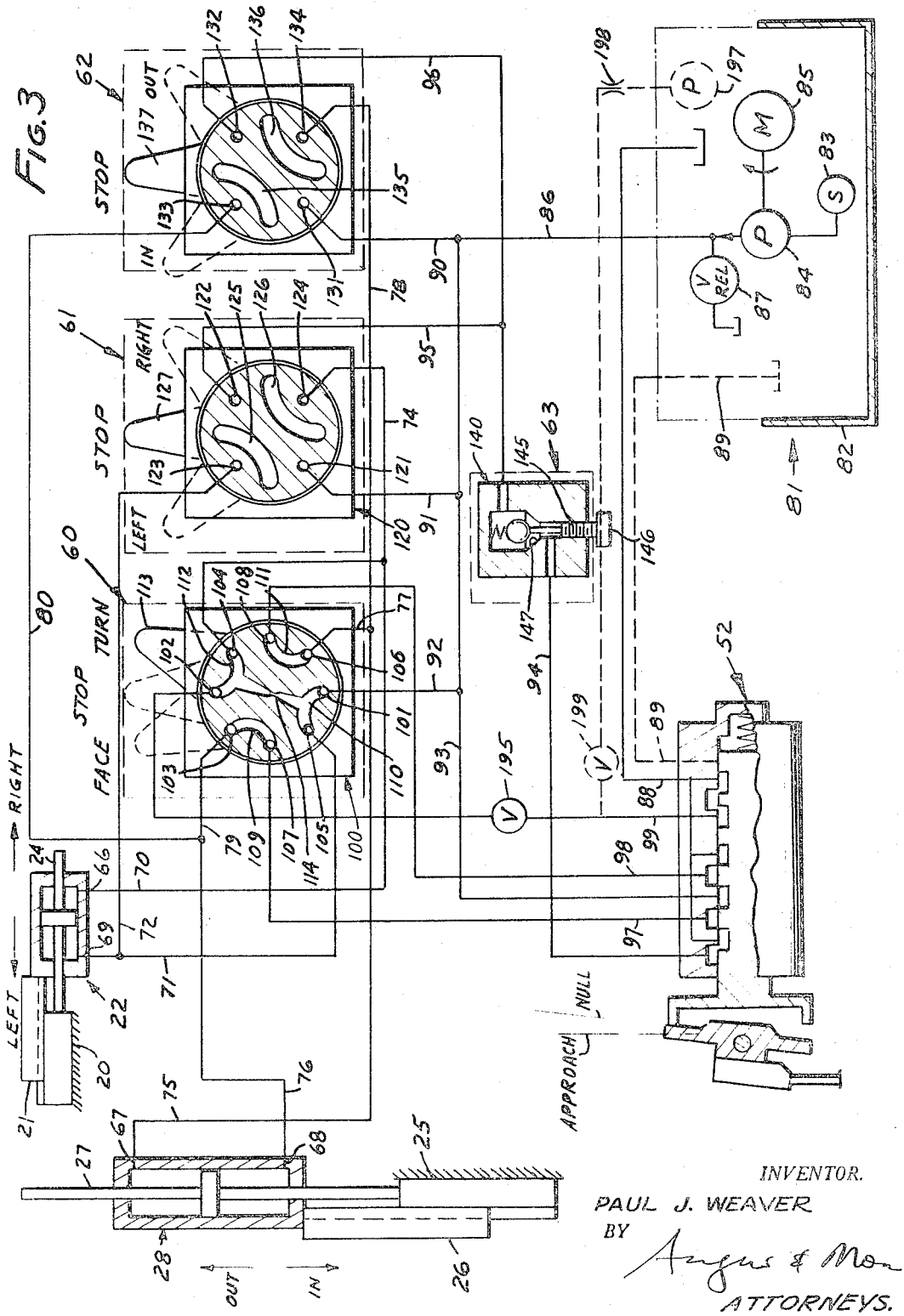

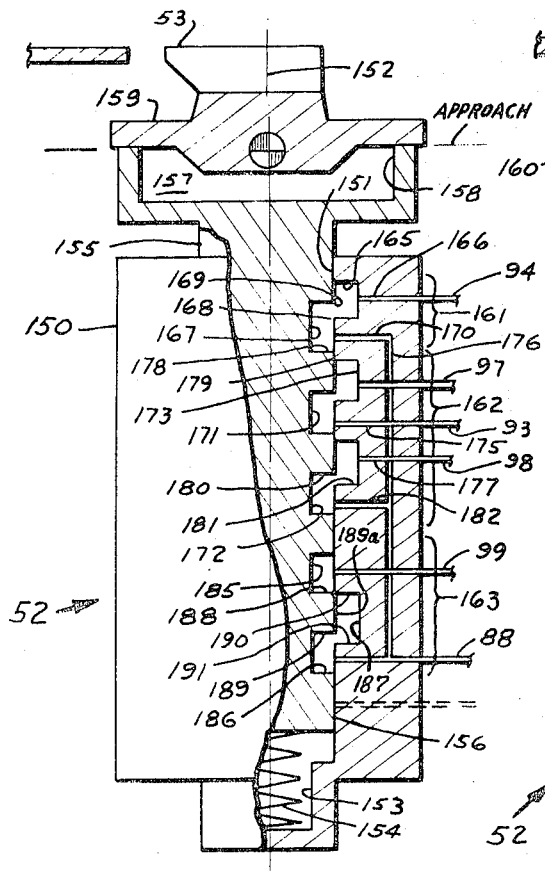

3,309,964
MACHINE TOOL
Paul J. Weaver, Pasadena, Calif., assignor to True-Trage Corporation, El Monte, Calif., a corporation of Connecticut
Continuation of abandoned application Ser. No. 368,971, May 20, 1964, which is a division of application Ser. No. 126,383, June 1, 1961, now Patent No. 3,161,095, dated Dec. 15, 1964. This application Apr. 11, 1966, Ser. No. 544,661
11 Claims. (Cl. 91—36)

This application is a continuation of applicant's co-pending patent application, Ser. No. 368,971, filed May 20, 1964, now abandoned, entitled "Machine Tool," which, in turn, is a division of applicant's patent application, Ser. No. 126,383, filed June 1, 1961, entitled, "Plural Slide, Tracer Controlled, Machine Tool Attachment," now Patent No. 3,161,095, issued Dec. 15, 1964.

This invention relates to a tracer attachment for a lathe, and to a control system useful therewith.

A feature of conventional tracer mechanisms is that some portion of the mechanism, usually the template, is fixedly related to the bed of the machine. For example, standard lathe tracers invariably have a template rail attached to the bed, together with means for adjusting the alignment of a template held by it. A number of inherent difficult difficulties arise from the situation, one of which is that the template rail is one of the most troublesome parts of a tracer mechanism to build, because the accuracy of the work is so dependent upon its rigidity and the accuracy with which it holds the template aligned. As the length of the work over which a template is effective is increased, the cost and complexity of installation and design of the template rail increases rapidly. As a result, in order to keep down costs and increase accuracy, the capacity of a tracer mechanism is often limited to a range of movement (for a given setup) which is less than that which the machine tool could accommodate for conventional machining.

It is an object of this invention to provide a tracer attachment for a lathe which carries its own template rail and template, and can therefore be shifted along with the remainder of the attachment so as to be effective on selected portions of the work region of the tool. A relatively short template and template rail can therefore be moved to be effective over the entire range of the tool's movement. It can therefore be made simpler, more rugged, and inherently more accurate, than corresponding parts of conventional lathe follower devices. Furthermore, because the attachment carries its own template rail, it can be used to convert a standard lathe into a tracer controlled tool without requiring the machine itself to be provided with a template rail, the installation of which is often a most troublesome matter.

An optional object of this invention is to provide controls for making such a device compatible with the conventional controls of a lathe so that it can readily be positioned, adjusted, and operated without reducing the lathe's capacities for standard operations.

Another optional object of this invention is to provide a tracer valve capable of exerting a dual axis control, one for contouring movement, and one for coordinated feeding movement, which also incorporates a safety cutoff that is effective during manually controlled slide positioning operations.

A tracer attachment according to this invention includes a base adapted to be mounted to the carriage or cross slide of a lathe. A first ways is mounted to the base, and a first carriage is mounted to the first ways. A second ways is mounted to the first slide, and a second slide is mounted to the second ways. The ways are disposed at an angle to each other, and the slides are adapted to move along them. In conventional installations, the first slide will move parallel to the longitudinal axis of the lathe, and the second slide will move in a plane that is normal to the longitudinal axis.

A tool holder is mounted to the second slide. A template holder is mounted to the base, and is adapted to hold a template. A tracer valve is mounted to the second slide, and the stylus projects from the tracer valve so as to contact the template. The attachment constitutes a self-contained tracer system, which can be positioned by the conventional slides and controls of the lathe for tracer controlled machining of selected regions of a work piece.

According to a preferred but optional feature of the invention, a tracer valve includes a contouring portion for exerting contouring control along one of the axes, and a coordinator portion for exerting a coordinated feed control for the other axis, thereby correlating the feed rate with the rate of plunge or retract of the contouring motion.

According to another preferred but optional feature of the invention, a safety cutoff portion is provided in the tracer valve which is effective on manual positioning circuits. The safety cutoff portion stops motion of the attachment's slides when the tracer stylus is over-deflected while the slides are under manual control.

Still another preferred but optional feature of the invention resides in a positioning control for operating a pair of fluid motors which actuate respective ones of the slides, said circuit including a power source, and a pair of positioning valves effective on respective ones of said motors for directing fluid under pressure to operate the motors in selected directions. A rate control valve is provided in the exhaust circuits from both of said fluid motors to adjust the rate of speed of movement of the slides when under this control, and the discharge from the rate control valve is passed through the safety cutoff portion of the tracer valve.

According to still another preferred but optional feature of the invention, the device includes a mode control for selectively connecting the contouring and coordinator portions of the tracer valve to selected ones of the fluid motors.

Still another preferred but optional feature of the invention resides in a restricted fluid path between opposite sides of the fluid motor which is connected to the coordinator portion of the tracer valve for assuring stoppage of the motor when under coordinator portion control.

The above and other features of this invention will be fully understood from the following detailed description and the accompanying drawings in which:

FIGURE 1 is a perspective view of the presently preferred embodiment of the invention;

FIG. 2 is a fragmentary perspective view of still another embodiment of the invention;

FIG. 3 is a circuit drawing of the presently preferred embodiment of a hydraulic system for controlling the devices of FIGS. 1 and 2;

FIGS. 4 and 5 are cross-sections showing two operating positions of a tracer valve used in FIG. 3;

FIG. 6 is a fragmentary cross-section of the tracer valve of FIGS. 4 and 5 in still another operating position; and FIG. 7 is a schematic cross-section showing details of a valve in the circuit of FIG. 3.

In FIG. 1, there is shown a lathe 10 having a head stock 11 and tail stock 12. This particular attachment is intended to be mounted to the carriage of the lathe. There are illustrated a longitudinal ways 13 and a carriage 14. The carriage carries a cross slide 15 and a compound rest 16. The axes of movement of the lathe component are along the longitudinal axis 17 and the cross axis 18.

One form of attachment, which is to be mounted on the carriage, includes a base 19 to which is mounted a longitudinal ways 20 (sometimes called the first ways). These ways carry a longitudinal slide 21 (sometimes called the first slide). A longitudinal motor 22 (sometimes called the first motor) includes a cylinder 23 and a rod 24. A piston (FIGS. 1 and 3) is fitted inside the cylinder and attached to the rod. The rod is affixed to the ways and the cylinder is fixed to the slide, so that upon application of fluid pressure to the motor, the piston and rod stand still relative to the base, and the cylinder and slide move horizontally, parallel to axis 17.

A cross ways 25 (sometimes called second ways) is mounted to the longitudinal slide. A cross slide 26 (sometimes called second slide) is mounted to cross ways 25 to move along axis 27. Axis 27 lies in a plane normal to axis 17, but does not necessarily intersect it. This is the conventional arrangement, although it could, if desired, intersect that plane at an angle. Axis 27 is not necessarily parallel to axis 18, although it may be, depending on the tool arrangement. In FIG. 1 it is not; in FIG. 2 it is, although it is possible for the arrangement to be skew if desired.

A fluid motor 28, which includes a cylinder 29 and a rod 30, has an internal piston (FIGS. 1 and 3) slidably fitted in the cylinder and fixed to the rod. Rod 30 is attached to cross ways 25, and cylinder 29 is attached to cross slide 26. Therefore, the cylinder and the cross slide move along axis 27, while the rod is fixed along its axis relative to the base.

A template rail assembly 35 is mounted by a bracket 36 to the base. It includes a base plate 37 and a reference plate 38. The reference plate is mounted to the base plate by a pin 39 and a screw-slot assembly 40 which permit pivotal adjustment of the reference plate around the pin. The reference plate has a reference edge 41 and carries template clamps 42 to clamp a template 43 against the base plate and with its reference edge 44 against reference edge 41 of the reference plate to line up the template.

A tracer mounting bracket 50 is attached to the cross slide 26 and extends to the left in FIG. 1, where it supports an adjustment slide 51. The adjustment slide has one of its elements mounted to bracket 50 and the other of its elements supports a tracer valve 52. Adjustment slide 51 extends parallel to axis 27, its objective being to move the tracer valve 52 toward and away from the template. Tracer valve 52 includes a stylus 53 for contacting the template edge.

A tool holder 54 is mounted by T-slots 55 to the cross slide and supports a tool 57, which extends toward a work piece 58, the objective being to duplicate on the work piece the contour of the template as traced by the tracer valve.

FIG. 2 illustrates the device of FIG. 1 adapted to be mounted to cross slide 15 in place of the compound, instead of being mounted directly to the carriage. Elements 20, 21, 25 and 26 are shown horizontally on the cross slide. The position of the other elements is not shown because it is believed to be obvious, the device of FIG. 1 having been "laid on its side." Suffice it to say that slide 26 will now move the tool holder horizontally in and out, and that the cross slide may be used to adjust the position of the template in and out relative to the work, thereby accomplishing a size adjustment for the work. Therefore, in this modification adjustment slide 51 can be eliminated, the tracer valve being mounted directly to tracer mounting bracket 50. In the arrangement shown, axis 27 (the direction slide 26 moves) will be parallel to axis 18 (the direction the cross slide moves). Apart from the elimination of adjustment slide 51 and the relocation of the elements so that axes 18 and 27 are parallel, the devices of FIGS. 1 and 2 are identical. Obviously, the template rail, template, and tracer valve keep the same angular relationships relative to each other in their new positions.

A control panel 59 is attached to the base in FIG. 1 (in FIG. 2 it will be more conveniently attached to ways 20) and incorporates four basic controls. There is a mode control 60 which determines whether the attachment shall operate to face or to turn work pieces when under tracer control. Internal boring is a special case of turning, the tool being moved cross center for the purpose. There is a pair of positioning controls 61, 62 for manually controlling left-right movement (along longitudinal axis 17) and in-out movement (along axis 27), respectively. There is also a speed control 63, which determines the speed at which the respective slides move when under the control of the positioning controls 61 and 62.

The detailed construction of a control system suitable for accomplishing the above functions will now be disclosed with initial reference to FIG. 3, wherein motors 22 and 28 are shown connected in the system. Motor 22 has ports 66 and 69 on opposite sides of its piston and motor 28 has like ports 67, 68. Motor supply lines 70, 71 are respectively connected to ports 66 and 69. Motor supply line 71 has a branch 72, and line 70 has a branch 74. Motor supply lines 75, 76 are respectively connected to ports 67 and 68. Motor supply line 75 has branches 77, 78, and motor supply line 76 has branches 79, 80.

A power supply 81 includes a reservoir 82 for holding hydraulic fluid, as well as a strainer 83, pump 84, and motor 85 for driving the pump. The pump discharges hydraulic fluid under pressure into a power line 86. A relief valve 87 in power line 86 discharges back into the reservoir and maintains a constant pressure in the power line. An exhaust line 88 discharges back into the reservoir, as does a drain line 89. Power line 86 has four branches 90, 91, 92 and 93.

Tracer valve 52, which will be described in greater detail below, has connected to it a number of lines which will be described at this point in connection with a description of the connections to the other controls. There is a safety cutoff line 94 connected to the discharge side of speed control 63, the other side of speed control 63 being connected to positioning exhaust lines 95 and 96. A pair of tracer supply lines 97, 98 are connected to the tracer as is branch 93 of the power line. A coordinator supply line 99 is also connected to the tracer valve.

The mode control 60 will now be described. The mode control includes a shear-seal type valve 100 (sometimes called a "mode selector valve"), which has eight ports, a power port 101, exhaust port 102, four motor ports 103, 104, 105, 106, and two tracer ports 107, 108. Connections between these ports to lines are as follows: Port 101, line 92; port 102, line 99; port 103, branch 79; port 104, branch 73; port 105, branch 71; port 106, branch 77; port 107, line 97; port 108, line 98.

Port 101 receives hydraulic fluid under pressure, and port 102 discharges it to the tracer valve through coordinator supply line 99. Ports 104 and 105 are connected to opposite sides of motor 22. Ports 103 and 106 are connected to opposite sides of motor 28. Ports 107 and 108 are attached to tracer supply lines 97 and 98.

The purpose of the shear-seal valve is to select which, if either of the motors, will be connected to particular portions of the tracer valve. The ports just described open in one face plate of the shear-seal valve. Overlying this face plate and in fluid sealing contact therewith, there is another plate having four fluid passages 109, 110, 111, 112. Each of these passages is long enough in extent to bridge between and interconnect two adjacent ones of the ports. This plate is rotatably movable by handle 113, and it will be noted that the fluid passages are curved so that at the middle position indicated by "stop," the fluid passages will be moved so that they do not make fluid connection with any port.

The mode control is shown in the position illustrated by the solid line handle; that is, "turn." If the handle were moved to the middle position, shown in dotted lines, and pointed to the word "stop," the fluid passages would not make any fluid connection. If the handle were moved to the position shown by "face," the fluid passages would all have been moved by 45° from the illustrated position, so that fluid passage 110, for example, would instead of bridging ports 101 and 105, bridge and interconnect ports 101 and 106.

An orifice 114 interconnects fluid passages 110 and 112 for purposes later to be described.

Positioning control 61 is a shear-seal type valve 120 which has four ports; a power port 121, exhaust port 122, and a pair of motor ports 123, 124. These ports are connected to lines as follows: Port 121, branch 91; port 122, branch 95; port 123, branch 72; port 124, branch 74.

Power port 121 receives fluid under pressure from the power line, port 122 discharges into the speed control, and ports 123 and 124 are connected to opposite sides of motor 22.

FIG. 7 schematically illustrates the construction of such a shear-seal valve. It includes a body 250 having a valving cavity. Ports 121–124 pass through the body into the cavity. Each has a seal insert, such as inserts 251, 252 for ports 121 and 124 (only these two ports will be illustrated, the others being identical). These inserts are spring-loaded downward by springs 253, 254, so as to press their ends against the face 255 of a rotatable plate 256. The plate has a pair of fluid passages 125, 126 drilled therein. Only passage 126 is illustrated. It has a pair of openings 257, 258 in its face 255. These openings are adapted to bridge a pair of adjacent ports in certain positions of the plate. In other positions of the plate, the insert bears against the flat face and flow is shut off. FIG. 7 illustrates a position of the valve (set by its shaft 259 to which a handle 127 is mounted) in which ports 121 and 124 are connected by passage 126. Passage 127 is similarly formed. Hereafter in this specification, for simplicity in disclosure, reference will be made to the schematic construction of FIG. 3, it being understood that it refers to the more realistic construction of FIG. 7.

Moving the handle 127 to the right in FIG. 3 will connect passage 125 to ports 122 and 123, while passage 126 will interconnect ports 121 and 124. Moving the handle to the left would cause fluid passage 125 to interconnect ports 121 and 123, while passage 126 would interconnect ports 122 and 124.

Positioning control 62 is identical to that of positioning control 61 in that it consists of a shear-seal type valve 130 having four ports: a power port 131, exhaust port 132, and motor ports 133 and 134 which open in the face of one plate. A rotatable plate includes fluid passages 135, 136 and a handle 137 identical to those of control 61. Power port 131 is connected to branch 90, exhaust port 132 to branch 96, and motor ports 133 and 134 to branches 80 and 78, respectively. The mode of operation of valve 130 is identical to that of valve 120 and will not be repeated here. Power port 131 is connected to the power line, exhaust port 132 is connected to the speed control, and ports 133 and 134 are connected to opposite sides of motor 28.

Speed control 63 consists of a needle-type metering valve 140 with a threaded stem 145, which can be moved axially by turning handle 146, which will vary the size of orifice 147 formed by the valve, and thereby regulate the rate of flow of fluid from either or both of conduit lines 95 and 96 to line 94.

Tracer valve 52 will now be described in detail with initial reference to FIG. 4. The tracer valve includes a sleeve 150 having an internal bore 151 with a central axis 152. A recess 153 is provided at the bottom of a bore to receive one end of a bias spring 154, which bears against the underside of a spool 155. The spool has an outer sidewall 156 which is circularly cylindrical and which makes a close sealing fit with the internal wall of the bore.

A cup 157 is formed at the upper end of the spool with a rim 158. A universally tiltable deflector member 159 is mounted (usually to the sleeve) above the cup and has an edge 160 which can bear against the rim when the deflector member is tilted to press the spool downwardly against the spring.

The deflector member, and its control over a tracer valve, are shown in applicant's copending patent application, Ser. No. 46,778, filed Aug. 1, 1960, now Patent No. 3,035,807, entitled "Tracer Valve," and assigned to the same assignee as the instant application. Reference may be made to the said patent for more details relating to the construction of this member. This member, being universally mounted, can tilt in all directions around center 159a. The deflector member carries stylus 53 and, as can be seen from FIGS. 4 and 5, contact between the stylus and the template does tilt the deflector member, causing some part of its edge to move downwardly and press the spool downwardly. This is the control action exerted by the template on the spool valve. In place of the universal type stylus mounting shown, it is possible to substitute the more conventional ball-cone stylus mounting, such as that shown in Sassen Patent No. 2,068,890, issued Jan. 25, 1937.

Means are provided for adjusting the hydraulic flow within the spool valve in accordance with the position of the stylus. The tracer valve for this purpose may conveniently be divided into three portions, which are: a safety cutoff portion 161, a contouring portion 162; and a coordinator portion 163. The safety cutoff portion includes a sleeve groove 165 which is connected at port 166 with safety cutoff line 94. It also includes an exhaust groove 167 formed in the spool. Grooves 165 and 167 have control edges 168, 169 (sometimes called "safety cutoff edges"), respectively. An exhaust conduit 170 formed in the sleeve interconnects groove 167 to exhaust line 88.

Contouring portion 162 includes a pressure groove 171 in the spool and exhaust groove 172 in the spool and shares exhaust groove 167 with the cutoff portion. A pair of motor supply grooves, 173, 174 are formed in the sleeve and are spaced apart from each other. A pressure port 175 passes through the wall of the sleeve and discharges into pressure groove 171 and connects with branch 93 of the power line.

Motor supply ports 176, 177 also pass through the wall of the sleeve and interconnect motor supply grooves 173 and 174 with tracer supply lines 97 and 98, respectively. Grooves 167 and 173 have control edges 178, 179, respectively. Grooves 172 and 174 have control edges 180, 181, respectively. Conduit 182 opens through the sleeve into exhaust groove 172 and connects that groove with exhaust line 88.

The coordinator portion includes a pair of spaced-apart spool grooves 185, 186 and a sleeve groove 187. Spool grooves 185 and 186 have control edges 188, 189, respectively, which bound a coordinator land 189a on the spool. Sleeve groove 187 has control edges 190, 191. Control edges 190 and 191 (sometimes called "coordinator edges") are axially farther apart than control edges 188 and 189 so that their axial spacing is greater than the length of the coordinator land, for a purpose later to be disclosed. When the valve is in the "null" position, shown in FIG. 3, control edges 188 and 189 are about equidistantly spaced from edges 190 and 191. At this same "null" position, control edges 178 and 179 and control edges 180 and 181 are either coincident or slightly overlap so as to cut off flow past them, and control edges 168 and 169 are underlapped so that flow can pass them. The condition of FIG. 3 illustrates the "null" position where just sufficient contact is made between the template and the stylus to deflect the valve to a position of equilibrium. FIG. 4 illustrates the condition where the stylus is off the template and at this time, it is necessary for the valve to operate to move the stylus toward the template, a condition referred to as "approach." At this condition, the deflector member has moved to the horizontal position illustrated by the word "approach" in FIG. 4, permitting the spool to go as high as possible. At this condition, control edges 168 and 169 are still underlapped, permitting fluid flow, control edges 188 and 190 have become coincident or slightly overlapped so as to cut off flow from line 99 to exhaust 88 through grooves 185, 187, and 186, and hydraulic fluid under pressure is able to flow from pressure port 175 into pressure groove 171 into motor supply groove 173 and out motor supply 97. Exhaust fluid returns through motor supply port 177, between underlapped control edges 180 and 181, into exhaust port 182, and out to exhaust.

In the condition where the stylus has been moved too close to the template by the positioning controls, and it is necessary for the valve and stylus to move somewhat farther away from it, a condition referred to as "retract," the deflector member will have been tilted even more than in FIG. 4, to the position shown as "retract" in FIG. 5. This will move the spool farther down in the sleeve than in the position of FIG. 4. At this condition, control edges 168 and 169 in the safety cutoff portion are still underlapped. Their safety control feature is not effective at this deflection. It is not effective anyway when the device is under tracer control. The tracer valve acts as its own safety device. Safety cutoff is needed only for when the device is under manual control. Control edges 189 and 191 in the coordinator portion will have become coincident or slightly overlapped in the position of FIG. 5, shutting off flow through the coordinator portion. The fluid connections in the contoured portion will have been reversed from those in FIG. 4; that is, pressure from port 175 will flow into motor supply groove 174 and out port 177 and exhaust will come back into port 176 and flow between underlapped control edges 178 and 179 and out exhaust port 170.

It will be recognized that FIGS. 4 and 5 show extreme positions of location of adjustment of the spool in the valve during normal contour tracer operations, and that FIG. 3 shows a medial position. In intervening positions between those of FIGS. 3 and 4 on one hand and of FIGS. 3 and 5 on the other, the contouring position will be open, but not as wide open, as in FIGS. 4 or 5, while the coordinator portion will be open, but not as wide open as in FIG. 3.

FIG. 6 shows safety cutoff portion 163 in its safety cutoff condition, which condition occurs when the stylus is tilted somewhat more than in FIG. 5, thereby pushing the spool farther down in the sleeve. At this position, edges 168 and 169 have overlapped, thereby shutting off flow from conduit 94. This is effective in stopping the motors when under control of the slide positioning controls. At this condition, the slide positioning controls are positively cut out, and it is necessary to switch the mode control over to face or turn and let the contouring and coordinate portions of the tracer valve get the machine out of the dangerous situation.

The term "groove" as used herein is not limited to full peripheral grooves, although these are often used, but also includes less than peripheral indentations, which may be pockets, or which may constitute notches in the edges of peripheral grooves such as shown in FIG. 7 of Weaver Patent No. 2,976,688 issued Mar. 28, 1961.

A shutoff valve 195, useful in setup operations, is provided in line 99.

A backoff circuit is shown in dotted line in FIG. 3 which can be used, but only when orifice 114 is closed off or not used. Thus, orifice 114 and the backoff circuit to be described are optional. In fact, both can be eliminated entirely, but the system has significant advantages with one or the other of them included. When they are used, a double end rod motor, or other type of motor, such as rotary, should be used which has substantially equal force-receiving areas on both sides. However, this is not an essential limitation. The backoff system comprises a pump 197 which draws fluid from the reservoir and discharges it through an orifice 198 and a needle valve 199 into coordinator supply line 99.

The object of the attachments in FIGS. 1 and 2 is to move a tracer element together with a template holder (and template) to a selected location along the bed of a lathe and appropriately position the device relative to the work, and then sequentially machine any number of products, either by facing or by turning. Accordingly, with initial reference to FIG. 1, the carriage 14 of the lathe is moved along the bed, using the conventional lathe carriage controls, until it reaches the region where the workpiece is to be machined. Then the carriage is locked to the bed and takes no further part in the machining operation and neither does the cross slide of the lathe. In fact, the cross slide could be removed, if desired, but one of the advantages of the device shown in FIG. 1 is that this attachment can be mounted to the lathe carriage and left there, being used only when desired. The standard elements of conventional lathe turning can also be left in place, and used independently of this attachment. The use of the device shown in FIG. 2 requires removal of the compound, and to this extent interferes with the ready use of the tool for standard machining. However, this is at least partially compensated for by the cost saving which results from the elimination of adjustment slide 51.

Assuming that the carriage has been placed where desired and locked in place, the template is next installed in its rail by appropriately aligning the reference plate and abutting the reference edges of the reference plate and template. A tool is placed in the tool holder.

Next the diameter to which the work is to be cut is adjusted by utilizing the adjustment slide 51 to move the tracer valve relative to the cutting tool. Once this relationship is established, the machine is set up and ready to go. In FIG. 2, the size adjustment is accomplished by moving the cross slide in or out with the conventional lathe cross slide control.

The device as shown provides a selection of facing and turning operations under tracer control together with positioning controls for moving the tool independently of the tracing operation for such purposes as retract movements, quick traverse, and the like.

Assume first that the device is to be utilized to turn workpiece 58 in a conventional turning operation. In this event, the feed will be to the left along axis 17, and the contouring movement will be in and out along axis 27. An object of the coordinator portion tracer valve 52 is to adjust the feed speed along axis 17 so as to keep a substantially constant surface rate of feed along the workpiece. Thus, when the tool must plunge into the workpiece to cut a shoulder and the like, then the longitudinal movement must slow down, or perhaps even stop entirely, thereby providing a coordinated control of speeds between the contouring and the feed movements. Accordingly, when placing the device on "turn," motor 28 is placed under control of the contouring portion of the tracer valve for regulating in and out movement, and motor 22 is placed under control of the coordinator portion of the tracer valve, which is the situation illustrated in FIG. 3.

In FIG. 3, it will be noted that pressure is supplied to power line 86 and branch 92 to power port 101, thence through fluid passage 110 to motor port 105, through branch 71 and line 69 to port 65 of motor 22. This will place the left hand side of the piston under pressure and move the cylinder to the left, which is the feed motion provided for in this attachment. Exhaust fluid leaves motor 22 through port 66, motor supply line 70, branch 73, and into motor port 104. From motor port 104, it passes through fluid passage 112 to exhaust port 102, whence it passes through coordinator supply line 99 to the coordinator portion of the tracer valve. The rate of flow through the coordinator portion is determined by the deflection of the stylus as hereinbefore set forth. When the spool is in a position such that flow can occur through the coordinator portion, then the feed motion will be to the left in FIG. 1, moving the tool to the left along the workpiece.

Contouring movement is accomplished by the movement of the spool in the tracer valve which receives fluid under pressure from power line 86 through branch 93 and into pressure port 175. Movement of the spool either way from the "null" position will put one or the other of the motor supply grooves 173 or 174 under pressure, and the other will serve as a return to exhaust. Assuming that the valve requires an approach to the template, then the situation will be as hereinbefore described in connection with FIG. 4, with pressure transmitted to tracer supply line 97, through which it flows to tracer port 107 of the mode selector. From that port, it flows through fluid passage 109 to motor port 103 and thence through branch 79 to motor supply 76 and port 68 of motor 28 which will move the cylinder in the "in" direction. Exhaust fluid will flow from port 67 through motor supply line 75 to branch 77 and motor port 106. Thence it flows through fluid passage 111 to tracer port 108 and thence through tracer supply line 98 back to the tracer. From line 98, it flows into grooves 174 and 172 and thence into the exhaust line. Reversal of the spool position, such as to that shown in FIG. 5, in which the tool is to be retracted, will place tracer supply line 98 under pressure, and line 97 will be the exhaust line, thereby reversing the direction of movement of motor 28.

Should it be desired to face a workpiece instead of to turn it, then the handle of the mode control will be moved from the position shown in solid line to the left position shown in dotted line, which will move all of the fluid passages of the mode control through an arc of 45°. This will make fluid interconnection between ports 101 and 106, between ports 108 and 104, between ports 102 and 103, and between ports 107 and 105. The result of such a shift of connections will be to connect the power line through power port 102 to motor port 106 and thence to port 67 of motor 28, which will cause the motor to move in the "out" direction, which is the direction of feed provided by this attachment for facing operations. The return from motor 28 will be through motor supply line 76, ports 103, fluid passage 112, port 102, line 99, and thence through the coordinator portion of the tracer valve.

Tracer control will be exerted on motor 22 by connection of lines 97 and 98 through ports 105 and 106, respectively. Thus, turning the mode selector to the face position will simply have switched the connections of the coordinator and contouring portions of the tracer valve between the motors 22 and 28. This device does not provide for a selection of directions of feed movements, but provides for only one direction of feed movement along each axis. An additional four-way valve, similar to valves 61 and 62, could be inserted in lines 70, 71 and 75, 76 to give a choice of feed direction, if desired.

The operation of the positioning controls will now be described with initial reference to positioning control 61, which is shown in FIG. 3 in the stop position, with all of its ports out of contact with any of the fluid passages. When the device is under the control of the mode control, positioning controls 61 and 62 are placed in their neutral or stop positions. When either of the positioning controls is used, then the mode control is placed in its stop position. Thus, the additional positioning devices are not ordinarily used when the device is under a tracer control, although their use at the same time is possible, provided care is used.

To operate motor 22 to move to the right, handle 127 is moved to the right in FIG. 3, which connects ports 121 and 124 through fluid passage 126 and ports 122 and 123, through fluid passage 125. This passes fluid under pressure from power line 86 through branch 91, thence between ports 121 and 124, through branch 74 and motor supply line 70 to port 66 of motor 22, which will move the slide to the right. Exhaust fluid passes from motor supply line 69 through branch 62, between ports 123 and 122, and out positioning exhaust line 95 to the speed control 63.

Movement of motor 22 to the left would be accomplished by moving the handle to the left in FIG. 3, thereby connecting ports 121 and 123 through fluid passage 125, and ports 122 and 124 through fluid passage 126. This will apply pressure from the power line to port 123, and thence to port 65 of motor 22, moving the slide to the left. Exhaust fluid would leave motor 66, pass through motor supply line 70 through branch 74 to port 124 and thence to port 122 and through positioning exhaust line 95 to speed control 63.

Similar operation of positioning control 62 directly controls the motion of motor 28 so that it will not be described in detail here. Suffice it to say that the exhaust from such operation passes through positioning exhaust line 96 to the speed control.

Speed control 63 is adjusted by turning its handle so as to adjust the size of the orifice, and this controls the ultimate rate of motion of the motors. The exhaust from the speed control passes through safety cutoff line 94 to the cutoff portion of the valve.

It will be seen that in the "approach" condition of the valve shown in FIG. 4, in the "retract" condition shown in FIG. 5, in the "null" condition shown in FIG. 3, and also in between the condition of FIG. 5, and that of the "cutoff" condition shown in FIG. 6, fluid can pass through the cutoff portion. However, if the stylus were overdeflected, such as by the template or some part of the tool, it would move the valve to the cutoff condition shown in FIG. 6. Then no fluid could flow through line 94, and, thus, the positioning controls would be rendered ineffective and the machine cannot be moved by the manual positioning controls in any direction, even in the direction away from the template or other obstacle. This is a control built into the tracer valve to prevent the tracer valve from being run into obstacles and damaged while under manual control. It is not effective on circuits controlled by the mode selector, but then none is necessary for this, because the tracer valve will protect itself automatically, retracting according to the template outline. In fact, to get out of the over-deflected condition, the mode selector is appropriately set and the tracer valve will reverse the machine as needed. Thereafter the mode selector can again be set at "stop" and the slides moved by manipulation of the positioning controls.

Orifice 114 is of utility in this invention for the reason that a tracer valve is inherently not a positive shutoff device, but in operation permits a small amount of fluid flow therethrough even when the sealing lands are coincident or overlapped. In a practical system, some force is always required to overcome the friction of the slide and the seals in the motor. This load usually requires 10 to 30 p.s.i. in the average piston-cylinder motor to start a slide moving. By placing orifice 114 across the fluid motor, which is what is accomplished by the arrangement shown, a supplemental flow is supplied of the same order of magnitude as the leakage through the coordinator portion. Therefore, even with leakage in the tracer valve, no motion results. Thus, there is obtained a much more reliable control over the motors. Orifice 114 is therefore made of such size that it will deliver fluid from port 101 to port 102 at a rate of flow substantially equal to the rate of leakage through the coordinating portion when control edges 188 and 190 or 189 and 191 overlap and before a pressure difference across the cylinder ports reaches a value sufficient to move the slide.

A feature lacking in conventional machine tool controls is a device capable of providing very slow reversal of movement on the feed axis to maintain good contact between the template and the stylus or, perhaps, to cut gentle back undercuts. That is the purpose of the back-off system shown. Assume that instead of using orifice 114, which would not be used when the backoff system is provided, a second source of pressure of a somewhat higher order of pressure than the basic system pressure from pump 84 is used. For example, suppose pump 84 delivers 200 p.s.i. and pump 197 delivers 250 p.s.i. As was stated above, some basic pressure difference across the cylinder ports is required for starting motion. If in this example 10 p.s.i. is required, then normal motion to the left would occur whenever the pressure at port 66 in cylinder 22 dropped to less than 190 p.s.i. (200 p.s.i. from the base supply being present at cylinder port 63). Conversely the slide motion would be to the right if a pressure greater than 210 p.s.i. could be made available to port 66.

With the stylus away from the template, the spool position would be as shown in FIG. 4, and the leakage flow across lands 188 and 190 would be at a minimum value. Oil from the 250 p.s.i. supply would then flow across the orifice, and across the partly open needle valve 199 (orifice 198 is not necessary, but provides a safe limit on the flow if the needle valve is opened to its greatest value). This flow is more than sufficient to accommodate the amount for the leakage and still provide some for cylinder movement to the "right" while maintaining a pressure at port 66 at a value greater than the 210 p.s.i. required for movement. Therefore, as the stylus moves toward the template by action of the cross slide, it will also bear slightly to the right due to the motion of the longitudinal cylinder when performing tracing operations.

In order to maintain the primary control of cylinder 22 by the tracer valve, the flow from the second source is usually restricted to a small amount so that no more than about a 10-degree angle to the right in turning is possible when the tracer is approaching the template as described above. However, note that such movement is possible only when the template permits it.

When the stylus is following the template and an exact 90° plunge motion is called for, cylinder 22 will come to a stop. The cylinder will stop when the pressure at port 66 reaches more than 190 p.s.i. for this example. At this time in this example, the pressure drop across the orifice and needle valve in the 250 p.s.i. supply would be 60 p.s.i. and thus permit a greater flow in this line than existed when the stylus was off of the template and described above. Lands in 188 and 190 remain slightly open and the spool will not permit the stylus to go into the completely non-tilted position shown in FIG. 3 to accommodate this flow. Instead, as the right side of the stylus traces down the 90° edge on the template, it will be in a slightly deflected position, maintaining a good contact with the template. Even if the template had a slight back angle, the stylus would still follow the template. When the stylus is tracing outwardly in a retract action along a 90° wall, a similar condition would take place with lands 189 and 191 now doing the throttling. Without this circuit, if it was assumed that a back angle did exist due to poor template fabrication or by design, the stylus would overdeflect when it is tracing out, thus causing a greater feed rate than desired and a resulting poorer surface finish. Equivalent movements and controls pertain for facing operations.

The total movement of the spool between the two shutoff points in the coordinator portion (the feed cylinder stopping motion) is compensated for by making the stylus wider than the cutting tool. With more flow from the auxiliary 250 p.s.i. circuit (assuming the needle valve more open), this distance is less. Alternately if the needle valve opening is reduced, the distance is greater. Therefore, some adjustment may be made with the needle valve to compensate for the stylus to tool size relationship.

The description thus far has been for a tracing attachment that used a tracing valve that controlled both cylinders. In some cases where there is no need for tracing opposed 90° shoulders a more economical tracing valve may be employed that only controls the one of the slides. Under these conditions line 99 would be capped and the positioning valves and needle valve 63 used to hydraulically feed the second slide. With this type of control the cross slide would usually be set at some angle to axis 17 other than 90°. The advantage of using two slides in the attachment during turning instead of using one tracing slide and the standard lathe carriage resides in the capacity to position the template and tracing attachment at any point on a large capacity lathe without the need of the usual large template and tracer insulation.

In this specification, the term "mounted to the carriage" is sometimes used to describe the mounting of the attachment either to the cross slide or the carriage. In FIG. 2, the device is obviously mounted to the carriage, even though this mounting is through the cross slide. Therefore in the claims, this terminology is intended to cover the construction of both FIGS. 1 and 2.

This invention thereby provides a device which can be utilized on a lathe without disturbing its basic components which can readily be positioned to any desired location, which can be switched from face to turning operations by the turn of a handle and which has its feed rate proportioned to its contouring rate, and which is more reliable in stopping operation, and which can even be backed up a trifle, if desired. All of these advantages are attained by a design which is of simple construction and moderate cost.

This invention is not to be limited by the embodiment shown in the drawings and described in the description which is given by way of illustration and not of limitation, but only in accordance with the scope of the appended claims.

I claim:

1. In a hydraulic circuit for controlling the operation of a hydraulic motor which in turn drives a machine tool component, the motor having a pair of ports, the rate of flow of liquid through the motor being determined by a tracer valve having the function of reversibly selecting either of said ports as an inlet port and the other as an outlet port, the improvement comprising: a shunt passage including a bi-directional flow orifice between and interconnecting said ports so as to supplement fluid flow from the outlet port with fluid supply from the inlet port regardless of which is selected as the inlet and which is selected as the outlet port.

2. In a hydraulic circuit for controlling the operation of a hydraulic motor which in turn drives a machine tool component, the motor having an inlet port and an outlet port, the rate of flow of liquid through the motor from a first pressure source supplying liquid under pressure at a first pressure being determined by a tracer valve, the improvement comprising: a second pressure source supplying liquid at a second, higher, pressure, and an orifice in the output of the said second source, liquid under pressure from said last-named orifice discharging into the fluid flow from the outlet port.

3. A hydraulic tracer valve comprising: a sleeve having an internal cylindrical wall forming a bore having a central axis; a spool having an axis and an exterior cylindrical wall, said spool being slidably disposed in said bore in close fitting relationship; a safety cutoff portion comprising a safety cutoff groove in each of the walls, each having a safety cutoff edge, the safety cutoff edges being adapted to overlap at a cutoff position of the spool in the sleeve; a contouring portion comprising a pair of spaced-apart motor supply grooves in one of said walls, a pressure groove, and a pair of exhaust grooves in the other of said walls, said exhaust grooves being on opposite sides of the pressure groove; one of said exhaust grooves and one of said safety cutoff grooves being the same groove; a coordinator portion comprising an axially spaced-apart inlet groove and outlet groove in one of said walls, a coordinator land between said inlet and outlet grooves, and a coordinator groove in the other of said walls bounded by a pair of coordinator control edges spaced axially farther apart from each other than the axial length of said coordinator land, the coordinator groove lying axially opposite said coordinator land so that the said coordinator land and said coordinator edges are adapted to overlap at various axial positions of the spool in the sleeve, the spool and sleeve having a normal central axial relative position wherein the safety cutoff edges are spaced apart and underlapped, and in which the motor supply grooves are equally spaced between the exhaust grooves, and in which the coordinator edges are both spaced from the coordinator land, the pressure groove being adapted to be connected to a source of pressure, the exhaust grooves, one of the safety cutoff grooves, and the outlet groove, being adapted to be connected to exhaust, the other of the safety cutoff grooves being adapted to be connected to a circuit to be shut down when the spool and sleeve are in the cutoff position, the spool when in the cutoff position being axially shifted from its normal central position, the inlet groove being adapted to be connected to a motor circuit whose speed is to be controlled, and the motor supply grooves being adapted to be connected to a motor whose direction and rate of movement are to be controlled.

4. In combination: a pressure source for supplying fluid under pressure; a pair of fluid motors; a tracer valve adapted to trace the contour of a template to cause a machine tool to reproduce the contour in a workpiece by controlling operation of the motors and thereby control machine tool movements along a pair of non-parallel axes, said tracer valve including a contouring portion comprising valving means adapted to control flow of fluid to opposite sides of one of said motors in accordance with the tracer valve's contact with a template and thereby control movement along one of said axes, a coordinator portion adapted to control flow of fluid through the other of said motors at a rate inversely proportioned to the flow through the contouring portion, and a safety cutoff portion having an inlet and an outlet and adapted to cut off fluid flow through the safety cutoff portion in one condition of the tracer valve; and a control circuit comprising a mode selector valve adapted to selectively connect either of the motors to the contouring portion and the other to the coordinator portion, and further adapted to disconnect both motors from either of said contouring and coordinator portions; a pair of positioning valves, one for each of said motors, adapted to connect a selected side of the respective motors to the pressure source and the other side to exhaust in order to determine the direction of operation of the respective motor, and having exhaust means connected to the safety cutoff portion so as to discharge therethrough.

5. A combination according to claim 4 in which the said exhaust means discharge to the safety cutoff portion through a variable orifice speed control valve, whereby the speed of operation of the motors when under control of the positioning valves is determined.

6. A combination according to claim 4 in which an additional pressure source of fluid under pressure discharges into the coordinator portion at a pressure higher than that of the first-mentioned pressure source.

7. A combination according to claim 4 in which an orifice is connected between the two sides of a motor when said motor is connected to the coordinator portion to compensate for fluid leakage in the coordinator portion and prevent the motor's creeping when the coordinator portion is shut to fluid flow.

8. A combination according to claim 4 in which the tracer valve comprises: a sleeve having an internal cylindrical wall forming a bore having a central axis, and a spool having an axis and an exterior cylindrical wall, said spool being slidably disposed in said bore in close fitting relationship; the safety cutoff portion comprising a safety cutoff groove in each of the walls, each having a safety cutoff edge, the safety cutoff edges being adapted to overlap at a cutoff position of the spool in the sleeve; the contouring portion comprising a pair of spaced-apart motor supply grooves in one of said walls, a pressure groove, and a pair of exhaust grooves in the other of said walls, said exhaust grooves being on opposite sides of the pressure groove; one of the coordinator portion comprising an axially spaced-apart inlet groove and outlet groove in one of said walls, a coordinator land between and bounded by said inlet and outlet grooves, and a coordinator groove in the other of said walls between and bounded by a pair of coordinator control edges spaced axially farther apart from each other than the axial length of said coordinator land, the coordinator groove lying axially opposite said coordinator land so that the said coordinator land and said coordinator edges are adapted to overlap at various axial positions of the spool in the sleeve, the spool and sleeve having a normal central axial relative position wherein the safety cutoff edges are spaced apart and underlapped, and in which the motor supply grooves are equally spaced between the exhaust grooves, and in which the coordinator edges are both spaced from the coordinator land, the pressure groove being connected to the pressure source, the exhaust grooves, one of the safety grooves, and the outlet groove being adapted to be connected to exhaust, the other of the safety cutoff grooves being adapted to be connected to the exhaust means from the positioning valves, the inlet grooves and motor supply grooves being connected to the mode selector valve for respective connection and disconnection to the motors.

9. A combination according to claim 8 in which the said exhaust means discharge to the safety cutoff portion through a variable orifice speed control valve, whereby the speed of operation of the motors when under control of the positioning valves is determined.

10. A combination according to claim 8 in which an additional pressure source of fluid under pressure discharges into the coordinator portion at a pressure higher than that of the first-mentioned pressure source.

11. A combination according to claim 8 in which an orifice is connected between the two sides of a motor when said motor is connected to the coordinator portion to compensate for fluid leakage in the coordinator portion and prevent the motor's creeping when the coordinator portion is shut to fluid flow.

References Cited by the Examiner
UNITED STATES PATENTS

| | | | |
|---|---|---|---|
| 2,330,567 | 9/1943 | Ehrenberg | 60—97 X |
| 2,391,492 | 12/1945 | Turcham et al. | 91—36 |
| 2,791,885 | 5/1957 | Sassen | 60—97 |
| 2,898,891 | 8/1959 | Gusching et al. | 60—97 |

EDGAR W. GEOGHEGAN, *Primary Examiner.*